United States Patent [19]

Anzai et al.

[11] 4,023,655
[45] May 17, 1977

[54] BRAKE FOR ELEVATOR

[75] Inventors: Nobuo Anzai; Takao Kato, both of Inazawa, Japan

[73] Assignee: Mitsubishi Denki Kabushiki Kaisha, Japan

[22] Filed: Nov. 21, 1975

[21] Appl. No.: 634,269

[52] U.S. Cl. .............................. 188/171; 188/1 R; 188/162

[51] Int. Cl.² ........................................ F16D 65/06

[58] Field of Search ............ 188/1 R, 2 R, 75, 162, 188/171, 264 R; 187/38, 73

[56] References Cited

UNITED STATES PATENTS

| 1,928,750 | 10/1933 | Apple et al. | 188/162 |
| 2,939,555 | 6/1960 | Flury | 188/171 X |
| 3,219,155 | 11/1965 | Kohli | 188/162 X |

FOREIGN PATENTS OR APPLICATIONS

| 1,174,499 | 11/1958 | France | 188/1 R |
| 922,633 | 1/1955 | Germany | 188/264 R |
| 1,063,860 | 8/1959 | Germany | 188/264 R |

Primary Examiner—Duane A. Reger
Attorney, Agent, or Firm—Robert E. Burns; Emmanuel J. Lobato; Bruce L. Adams

[57] ABSTRACT

The disclosed brake includes a brake wheel directly connected to an electric motor for an elevator car, and a pair of opposite brake shoes resiliently engaging the brake wheel through respective brake linings applied to the shoes and responsive to the energization of an electromagnet to permit the rotation of the motor. Each shoe is provided on that side remote from the brake lining with a heater for continuously heating the lining to prevent it from becoming wet.

4 Claims, 3 Drawing Figures

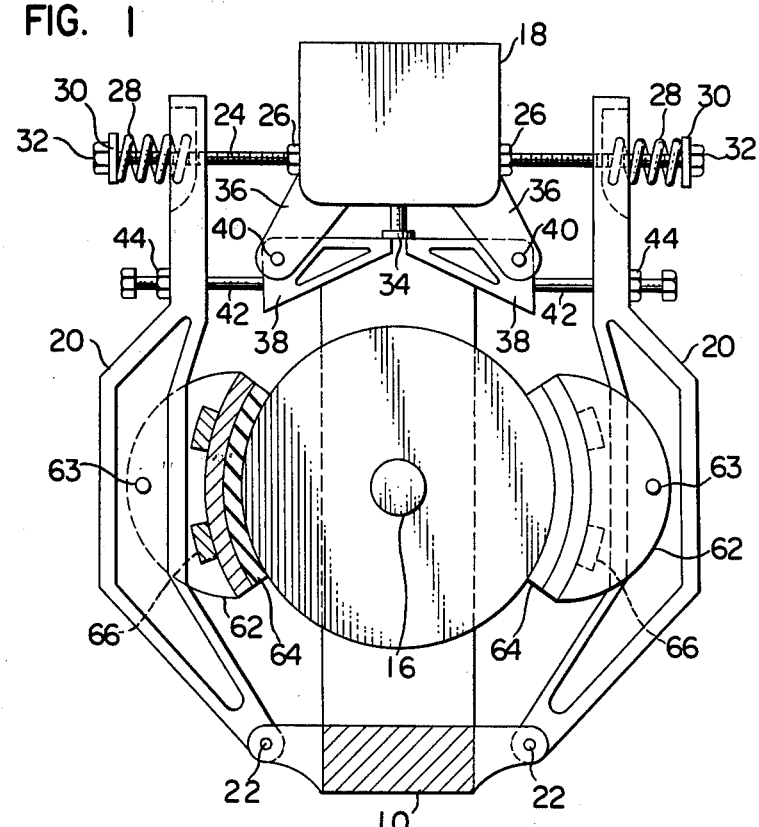

BRAKE FOR ELEVATOR

BACKGROUND OF THE INVENTION

This invention relates to improvements in a brake device for braking an electric motor for an elevator car through brake linings.

Alternating-current (AC) operated elevator systems are constructed such that the induction motor is used to drive an associated elevator car and that, in order that the car is caused to land and stop at any desired floor of a building served by the car, the power supply to the induction motor is interrupted while at the same time a coil of the electromagnetic brake device associated with the motor is denergized to brake a brake wheel directly connected to the induction motor by means of the action of a spring force for the stoppage of the elevator car. However a braking force exerted by the electromagnetic brake device is variable because an associated brake lining for braking the brake wheel by means of a frinctional force developed therebetween has a coefficient of friction changed under the influence of surrounding parameters. Therefore, even with the particular elevator car kept under the same loading, the car can not stop at a predetermined fixed position resulting in a tendency to increase the landing error beyond a predetermined limit.

As a result of repeated experiments conducted with various surrounding parameters affecting the coefficient of friction of the brake lining, it has been confirmed that humidity is one of the surrounding parameters exhibiting the important effects. That is, it has been experimentally discovered that if the brake lining becomes wet that the coefficient of friction thereof increases to stop the associated elevator car somewhat short of a predetermined position assigned to the car even with the same spring force. This has resulted in inaccurate landing of an elevator car.

SUMMARY OF THE INVENTION

Accordingly it is a general object of the present invention to eliminate the disadvantage of the prior art practice as above described.

It is an object of the present invention to provide a new and improved brake device for use with a moving member such as an elevator car to accurately maintain the moving member at its position where the member is to be stopped with a coefficient of friction of an associated brake lining remaining unchanged under the influence of the surrounding humidity.

The present invention accomplishes these objects by the provision of a brake device for use with an elevator car, comprising an electric motor for driving an elevator car, a brake wheel connected to the electric motor to be rotated by the latter, a pair of brake shoes disposed to be located on diametrically opposite sides of the brake wheel, each of the brake shoes having a force always applied thereto to push the outer periphery of the brake wheel by spring means, a brake lining fixedly secured to the inside of each of the brake shoes to brake the brake wheel with a frictional force thereof, electromagnet means energized simultaneously with the power supply to the electric motor to move the brake shoes away from the outer periphery of the brake wheel, and heating means disposed adjacent to the brake lining to heat the latter.

BRIEF DESCRIPTION OF THE DRAWING

The present invention will become more readily apparent from the following detailed description taken in conjunction with the accompanying drawing in which:

FIG. 1 is a front elevational view of a brake device for use with an elevator car constructed in accordance with the principles of the present invention with parts illustrated in section;

FIG. 2 is a side elevational view of the arrangement shown in FIG. 1; and

FIG. 3 is an elevational view, partly in section of the electromagnet shown in FIGS. 1 and 2.

DESCRIPTION OF THE PREFERRED EMBODIMENT

Referring now to FIGS. 1 and 2 of the drawings, there is illustrated an embodiment of the present invention applied to an electromagnetic brake device for use with a winding machine for an elevator car. The arrangement illustrated comprises a horizontal thick base plate 10 including a strip-shaped support member 12 vertically extending therefrom, a brake wheel 14 directly connected to an electric motor (not shown) through its shaft 16 rotatably extending through and journalled by the vertical support member 12 and an electromagnet schematically shown by a block 18 and fixedly secured to the upper horizontally bent end portion of the vertical support member 12 at the extremity to be vertically aligned with the brake wheel 14. The electric motor not shown is adapted to drive an elevator car also not shown. A pair of opposite arms 20 are pivotably mounted to both sides of the base plate 10 to vertically extend with the central lines thereof lying in the central diametric plane of the brake wheel 14. To this end, each of the arms 20 has its lower end disposed between a pair of opposite protrusions from either side of the base plate 10 and pivotably secured thereto through a pivot pin 22. Each arm 20 includes a lower curved section and an upper straight section vertically directed.

A threaded rod 24 loosely extends through the upper end portion of the straight section of each arm 20 and has one end screw threaded in the adjacent side of the electromagnet 18 and fixed thereto by means of a lock nut 26. The other end portion of the threaded rod 24 has a compression spring 28 disposed therearound between a spring retainer 30 fitted onto the rod 24 and a recess disposed on that portion of the arm 20 through which the rod 24 extends with a lock nut 32 engaging the threaded rod 24 to maintain the retainer 30 in place on the rod 24. The spring 28 tends to normally push the associated arm 20 toward the electromagnet 18 and therefore the brake wheel 14.

The electromagnet 18 includes a plunger 34 centrally pending from the lower surface thereof, and a pair of opposite legs 36 downwardly extending toward that arm 20 adjacent thereto. Then a lever 38 in the form of a generally right-angled triangle is pivotably secured at its point adjacent to the right-angled corner to the extremity of each leg 36 through a pivot pin 40 with the right-angled corner portion or vertex thereof disposed between the legs 36. Then a push bolt 42 is screw threaded into the lower end portion of the straight arm 20 section and fixed thereto through a lock nut 44. The push bolt 42 has its end suitably connected to the adjacent edge of the "triangle" 38. As shown in FIG. 1, the pair of levers 38 oppose to each other to form a small gas between cut angle ends thereof and have longer edges extending from the respective vertices and lying in a common horizontal plane. The cut angle ends of both levers 38 are bridged and contacted by the larger diameter portion of the plunger 34.

In FIG. 3, the electromagnet 18 is shown as including a stationary iron core 50 disposed on the central lower portion thereof, a bush 52 having its lower portion snugly fitted onto the iron core 50, and a movable iron core 54 disposed above the stationary iron core 50 to be normally spaced away therefrom. The movable iron core 52 has the plunger 34 fixed to the center of the lower surface thereof and loosely extending through the stationary iron core 50. As above described, the plunger 34 has its larger diameter portion contacted by the horizontal edges of the opposite levers 38 thereby to maintain the movable iron core 50 normally spaced away from the stationary iron core 50. The stationary iron core 50 is disposed within a cup-shaped yoke 56 by having the lower end rigidly fitted into a bottom opening on the bottom of the yoke 56 to be flush with the yoke's bottom surface. The cup-shaped yoke 56 and the bush 52 form therebetween an annular space within which an energizing coil 58 is suitably fixed. After the coil 58 has been disposed within the annular space, a disc-shaped yoke 60 with a central aperture is disposed at the upper open end of the annular space to close it. The movable iron core 54 is disposed in both the aperture on the yoke 60 and the interior of the bush 52 consecutive thereto so that the upper end thereof is normally substantially flush with the upper surface of the yoke 60.

Referring back to FIGS. 1 and 2, the arms 20 have their lower curved sections facing the adjacent portions of the outer periphery of the brake wheel 14 and having respective brake shoes 62 pivotably secured to the center of the internal portions of the lower curved arm 20 section. Each of the brake shoes 62 includes a surface normally concentric with the outer periphery of the brake wheel 14 and applied with a brake lining 64. The brake lining 64 is coextensive to the surface of the brake shoe 62 and normally contacted by the adjacent portion of the periphery of the brake wheel 14 by action of the associated spring 28.

Each of the brake shoes 62 is provided on that surface thereof remote from the brake lining 64 with a plurality, in this case two, of heating elements 66 such as electric heaters adapted to be continuously energized.

The arrangement thus far described is operated as follows: With the electric motor (not shown) put in its inoperative state, the opposite arms 20 has applied thereto forces acting to be turned toward each other by means of the action of the compression springs 28. Thus the brake lining 64 fixed to the respective brake shoes 62 serve to push the outer periphery of the brake wheel 14 to restrain the rotational movement of the electric motor (not shown), that is to say, the travel of an elevator car (not shown) driven by that motor. When the electric motor is energized simultaneously with the energization of the electromagnet 18, the movable iron core 54 is pulled down by the stationary iron core 50 to cause the plunger 34 to push downwardly the opposite ends of the levers 34. This results in the pivotal movement of both levers 38 about the axes of the associated pivot pins 40. Therefore the push rods 42 connected to the levers 38 turn the arms 20 outwardly about the axes of the pivot pins 22 against the forces of the springs 28 thereby to permit the brake lining 64 to be seperated away from the outer periphery of the brake wheel 41 to release the restraint applied to the electric motor (not shown). Therefore the electric motor now energized can be rotated to travel the associated elevator car (not shown).

When the traveling car is to be stopped, the electromagnet 18 and the electric motor are simultaneously deenergized. This causes the lift of the plunger 34 to return the levers 38 back to their original positions as shown in FIG. 1 by means of the action of the springs 28. Therefore the brake linings 64 are permitted to contact the brake wheel 14 to brake the latter and therefore the electric motor until the car is stopped.

As previously described, the heating elements 66 continue to heat the associated brake linings 64. Even if the brake linings 64 are humidified to a high humidity around the electromagnetic brake device either during the rainy season, or for artificial reasons, then moisture absorbed by the brake linings 64 is effectively vaporized so that each brake lining 64 always maintain a constant magnitude of the coefficient of friction as previously equal to that during the dry season, without the coefficient of friction affected by the surrounding humidity. As a result, the brake linings 64 always brake the brake wheel 14 with a braking force having a constant magnitude.

In summary, the present invention discloses heating means for heating brake linings for braking a brake wheel thereby to prevent the humidification of the brake linings to maintain their coefficient of friction constant. This ensures that the braking force exerted by the brake lining be constant to always maintain a position of an associated elevator car stopped to be highly accurate.

While the present invention has been illustrated and described in conjunction with a single preferred embodiment thereof it is to be understood that numerous changes and modifications may be resorted to without departing from the spirit and scope of the present invention. For example, each of the heating elements may be operatively associated with a thermostat. In this case, the heating elements are arranged to be deenergized upon their reaching a temperature sufficient to remove moisture from the brake lining, for example, about 70° C. This measure prevents the brake lining from being further wastefully heated. This results in the saving of electric power required for the brake device. Alternatively a positive characteristic thermistor may be substituted for the thermostat.

What we claim is:

1. A brake for an elevator car driven by an electric motor comprising;
   a brake drum connected, in use, to the electric motor to be rotated thereby;
   a pair of brake shoes disposed diametrically on opposite sides of said brake drum and movable toward and away from said brake drum, each of said brake shoes having a brake lining secured on a surface thereof facing said brake drum;
   biasing means for continuously biasing said brake shoes toward said brake drum for applying a braking force thereto;
   moving means, including an electromagnet for moving said brake shoes away from said brake drum against the action of said biasing means when the electric motor is energized and for allowing said brake shoes to be moved toward said brake drum by the action of said biasing means when the electric motor is deenergized; and heating means, for heating said brake lining to a temperature sufficient to remove moisture therefrom, whereby the coefficient of friction between said brake lining and said brake drum is maintained substantially constant.

2. A brake device for use with an elevator car as claimed in claim 1 wherein said heating means comprises an electric heater.

3. A brake device for use with an elevator car as claimed in claim 1 wherein said heating means comprises an electric heater and a thermostat operatively associated therewith.

4. A brake device for use with an elevator car as claimed in claim 1 wherein said heating means comprises an electric heater and a positive characteristic thermistor operatively associated therewith.

* * * * *